(12) United States Patent
Yamamoto

(10) Patent No.: US 8,903,213 B2
(45) Date of Patent: Dec. 2, 2014

(54) OPTICAL FIBER AND OPTICAL COMMUNICATION SYSTEM INCLUDING THE SAME

(71) Applicant: Sumitomo Electric Industries, Ltd., Osaka (JP)

(72) Inventor: Yoshinori Yamamoto, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 0 days.

(21) Appl. No.: 13/771,745

(22) Filed: Feb. 20, 2013

(65) Prior Publication Data

US 2014/0064685 A1      Mar. 6, 2014

Related U.S. Application Data

(60) Provisional application No. 61/697,536, filed on Sep. 6, 2012.

(30) Foreign Application Priority Data

Feb. 28, 2012   (JP) ................................. 2012-041335

(51) Int. Cl.
  *G02B 6/02* (2006.01)
  *G02B 6/036* (2006.01)
(52) U.S. Cl.
  CPC . *G02B 6/02* (2013.01); *G02B 6/036* (2013.01)
  USPC .......... 385/123; 385/124; 385/125; 385/126; 385/127; 385/128
(58) Field of Classification Search
  CPC ... G02B 6/02; G02B 6/03627; G02B 6/02261
  USPC .................. 385/123, 124, 125, 126, 127, 128
  See application file for complete search history.

(56) References Cited

U.S. PATENT DOCUMENTS

| 6,212,322 | B1 * | 4/2001 | Ma et al. | 385/123 |
| 6,768,852 | B2 * | 7/2004 | Zhang | 385/127 |

FOREIGN PATENT DOCUMENTS

| JP | 10-293225 A | 11/1998 |
| JP | 2002-527774 | 8/2002 |
| JP | 4393708 B2 | 1/2010 |

OTHER PUBLICATIONS

"LEAF Optical Fiber", Catalog, Corning Incorporated, Aug. 2011.
English-language translation of International Preliminary Report on Patentability (IPRP) dated Sep. 12, 2014 that issued in WO Patent Application No. PCT/JP2013/052754.

\* cited by examiner

*Primary Examiner* — Jennifer Doan
(74) *Attorney, Agent, or Firm* — Drinker Biddle & Reath LLP

(57) ABSTRACT

An optical fiber according to an embodiment of the present invention is provided with a center core, a side core, and a cladding. The center core includes a ring part where a relative index difference varies discontinuously, in its peripheral region, and when a is a radius from a core center to an outside of the ring part and c is a radius to a position where the relative index difference is maximum in the side core, an index profile is realized in a shape where c/a is in the range of 2.25 to 2.50, so as to enable setting of a dispersion value, a cable cutoff wavelength, a bending loss in the diameter of 20 mm, and an effective area in desired ranges.

14 Claims, 17 Drawing Sheets

Fig. 4

| PARAMETER | Δ1 | Δ2 | Δ3 | Δring | a | c/a | b | d | w | V | α |
|---|---|---|---|---|---|---|---|---|---|---|---|
| UNIT | % | % | % | % | µm | | µm | µm | µm | %·µm² | |
| SAMPLE 1 | 0.586 | 0.073 | 0.166 | 0.220 | 2.52 | 2.46 | 4.02 | 8.68 | 0.42 | 0.055 | 5.85 |
| SAMPLE 2 | 0.597 | 0.076 | 0.168 | 0.220 | 2.45 | 2.41 | 3.84 | 8.24 | 0.41 | 0.054 | 5.85 |
| SAMPLE 3 | 0.613 | 0.077 | 0.173 | 0.220 | 2.41 | 2.33 | 3.78 | 7.90 | 0.40 | 0.053 | 5.85 |
| SAMPLE 4 | 0.634 | 0.078 | 0.178 | 0.220 | 2.33 | 2.25 | 3.66 | 7.48 | 0.39 | 0.049 | 5.85 |

Fig.5

| PARAMETER | TRANSMISSION LOSS AT 1550nm | DISPERSION AT 1530nm | DISPERSION AT 1565nm | DISPERSION AT 1625nm | DISPERSION SLOPE AT 1550nm | $\lambda cc$ | MFD at 1550nm | Aeff at 1550nm | BENDING LOSS IN DIAMETER OF 20 mm AT 1550nm |
|---|---|---|---|---|---|---|---|---|---|
| UNIT | dB/km | ps/nm/km | ps/nm/km | ps/nm/km | ps/nm²/km | µm | µm | µm² | dB/m |
| SAMPLE 1 | 0.195 | 2.37 | 5.16 | 9.89 | 0.080 | 1.391 | 9.60 | 68.4 | 13.7 |
| SAMPLE 2 | 0.195 | 2.48 | 5.33 | 10.14 | 0.082 | 1.382 | 9.60 | 68.5 | 9.1 |
| SAMPLE 3 | 0.194 | 2.44 | 5.37 | 10.28 | 0.084 | 1.364 | 9.60 | 68.6 | 6.0 |
| SAMPLE 4 | 0.196 | 2.44 | 5.46 | 10.48 | 0.086 | 1.325 | 9.60 | 68.7 | 4.4 |

Fig.10A

| PARAMETER | Δ1 | Δ2 | Δ3 | Δring | a | c/a | b | d | w | V | α |
|---|---|---|---|---|---|---|---|---|---|---|---|
| UNIT | % | % | % | % | μm | | μm | μm | μm | %·μm² | |
| SAMPLE 5 | 0.605 | 0.074 | 0.181 | 0.070 | 2.55 | 2.46 | 4.00 | 8.17 | 0.33 | 0.013 | 3.31 |

Fig.10B

| PARAMETER | TRANSMISSION LOSS AT 1550nm | DISPERSION AT 1.53μm | DISPERSION AT 1.565μm | DISPERSION AT 1.625μm | DISPERSION SLOPE AT 1.55μm | λcc | MFD at 1.55μm | Aeff at 1.55μm | BENDING LOSS IN DIAMETER OF 20 mm AT 1.55μm |
|---|---|---|---|---|---|---|---|---|---|
| UNIT | dB/km | ps/nm/km | ps/nm/km | ps/nm/km | ps/nm²/km | μm | μm | μm² | dB/m |
| SAMPLE 5 | 0.197 | 2.37 | 5.31 | 10.24 | 0.084 | 1.352 | 9.60 | 68.8 | 11.1 |

Fig. 15

| PARAMETER | Δ1 | Δ2 | Δ3 | Δring | a | c/a | b | d | w | V | α |
|---|---|---|---|---|---|---|---|---|---|---|---|
| UNIT | % | % | % | % | μm | | μm | μm | μm | %·μm² | |
| SAMPLE 6 | 0.613 | 0.078 | 0.168 | 0.275 | 2.46 | 2.39 | 3.80 | 8.00 | 0.42 | 0.052 | 4.73 |
| SAMPLE 7 | 0.598 | 0.078 | 0.168 | 0.275 | 2.46 | 2.39 | 3.80 | 8.00 | 0.42 | 0.052 | 4.73 |
| SAMPLE 8 | 0.613 | 0.088 | 0.168 | 0.275 | 2.46 | 2.39 | 3.80 | 8.00 | 0.42 | 0.052 | 4.73 |
| SAMPLE 9 | 0.613 | 0.073 | 0.168 | 0.275 | 2.46 | 2.39 | 3.80 | 8.00 | 0.42 | 0.052 | 4.73 |
| SAMPLE 10 | 0.613 | 0.078 | 0.183 | 0.275 | 2.46 | 2.39 | 3.80 | 8.00 | 0.42 | 0.052 | 4.73 |
| SAMPLE 11 | 0.613 | 0.078 | 0.140 | 0.275 | 2.46 | 2.39 | 3.80 | 8.00 | 0.42 | 0.052 | 4.73 |
| SAMPLE 12 | 0.610 | 0.073 | 0.189 | 0.250 | 2.61 | 2.49 | 4.15 | 8.96 | 0.44 | 0.075 | 4.83 |
| SAMPLE 13 | 0.591 | 0.077 | 0.187 | 0.030 | 2.96 | 2.40 | 4.61 | 9.37 | 0.31 | 0.012 | 3.33 |
| SAMPLE 14 | 0.591 | 0.077 | 0.202 | 0.030 | 2.96 | 2.40 | 4.61 | 9.37 | 0.31 | 0.012 | 3.33 |
| SAMPLE 15 | 0.607 | 0.073 | 0.183 | 0.238 | 2.54 | 2.47 | 4.05 | 8.27 | 0.26 | 0.043 | 3.27 |
| SAMPLE 16 | 0.622 | 0.064 | 0.163 | 0.160 | 2.42 | 2.43 | 3.95 | 7.83 | 0.35 | 0.030 | 3.30 |

Fig. 16

| PARAMETER | TRANSMISSION LOSS AT 1550nm | DISPERSION AT 1530nm | DISPERSION AT 1565nm | DISPERSION AT 1625nm | DISPERSION SLOPE AT 1550nm | λcc | MFD at 1550nm | Aeff at 1550nm | BENDING LOSS IN DIAMETER OF 20 mm AT 1550nm |
|---|---|---|---|---|---|---|---|---|---|
| UNIT | dB/km | ps/nm/km | ps/nm/km | ps/nm/km | ps/nm²/km | μm | μm | μm² | dB/m |
| SAMPLE 6 | 0.196 | 2.48 | 5.35 | 10.22 | 0.082 | 1.387 | 9.58 | 68.2 | 6.5 |
| SAMPLE 7 | 0.195 | 3.01 | 5.97 | 10.95 | 0.084 | 1.366 | 9.83 | 72.1 | 10.1 |
| SAMPLE 8 | 0.2 | 2.97 | 5.85 | 10.71 | 0.082 | 1.382 | 9.60 | 68.4 | 7.0 |
| SAMPLE 9 | 0.199 | 2.03 | 4.96 | 9.93 | 0.084 | 1.363 | 9.60 | 68.7 | 8.9 |
| SAMPLE 10 | 0.195 | 2.50 | 5.51 | 10.58 | 0.086 | 1.434 | 9.75 | 71.0 | 7.7 |
| SAMPLE 11 | 0.193 | 2.25 | 4.99 | 9.66 | 0.078 | 1.246 | 9.35 | 64.7 | 9.9 |
| SAMPLE 12 | 0.194 | 2.13 | 4.87 | 9.55 | 0.078 | 1.425 | 9.48 | 67.1 | 2.4 |
| SAMPLE 13 | 0.197 | 2.65 | 5.21 | 9.50 | 0.073 | 1.283 | 9.33 | 64.4 | 8.7 |
| SAMPLE 14 | 0.196 | 2.38 | 5.04 | 9.59 | 0.075 | 1.326 | 9.45 | 66.4 | 2.6 |
| SAMPLE 15 | 0.202 | 2.35 | 5.25 | 10.13 | 0.083 | 1.373 | 9.66 | 69.7 | 12.1 |
| SAMPLE 16 | 0.207 | 3.04 | 6.00 | 11.03 | 0.086 | 1.194 | 9.90 | 73.4 | 19.9 | ved
OPTICAL FIBER AND OPTICAL COMMUNICATION SYSTEM INCLUDING THE SAME

This application claims the benefit of U.S. Provisional Application No. 61/697,536 filed Sep. 6, 2012, which is incorporated by reference herein in the entirety.

BACKGROUND OF THE INVENTION

1. Field of the Invention

The present invention relates to an optical fiber and an optical communication system including the same.

2. Related Background Art

A non-zero dispersion-shifted fiber (NZDSF) is known as an optical fiber used as a signal light transmission path in an optical communication system. NZDSF has positive chromatic dispersion and small but non-zero absolute values of chromatic dispersion in the entire range of the C-band (wavelengths of 1530 to 1565 nm) and the L-band (wavelengths of 1565 to 1625 nm).

It is expected that such NZDSF has the preferred characteristics as described in LEAF Optical Fiber Catalog, Corning Incorporated (Non-Patent Document 1), as to the chromatic dispersion, dispersion slope, mode field diameter, effective area, cable cutoff wavelength, bending loss, and so on. Japanese Patent No. 4393708 (Patent Document 1) and Japanese Patent Application Laid-Open No. 10-293225 (Patent Document 2) disclose the optical fibers having such preferred characteristics.

The optical fiber disclosed in Patent Document 1 has a core consisting of three segments. The three segments consist of a first segment with an α-power index profile, and a second segment and a third segment provided around the first segment and each having a step index profile. The optical fiber disclosed in Patent Document 2 consists of a center core, a first ring provided on the outer periphery of the center core, a second ring provided on the outer periphery of the first ring and having the refractive index lower than the center core and higher than the first ring, a third ring part provided on the outer periphery of the second ring and having the refractive index higher than a cladding, and the cladding provided on the outer periphery of the third ring part.

SUMMARY OF THE INVENTION

The inventor investigated the conventional optical fibers and found the following problem. Namely, the structures of the optical fibers disclosed in Patent Document 1 and Patent Document 2 above had narrow tolerable ranges of structural parameters due to production variation and it was difficult to manufacture the optical fibers with desired characteristics at good yield.

The present invention has been accomplished in order to solve the above problem and it is an object of the present invention to provide an optical fiber with a structure capable of readily achieving desired characteristics without reduction of production yield and an optical communication system including the optical fiber.

In order to achieve the above object, an optical fiber according to the present invention, as a first aspect, comprises a center core a center of which extends along a predetermined axis, a side core provided on an outer peripheral surface of the center core, and a cladding provided on an outer peripheral surface of the side core. In the optical fiber of the first aspect, the center core has a peak part, and a tail part including a ring part. Specifically, in an index profile defined by relative index differences with respect to a refractive index of the cladding, of respective portions along a reference line perpendicular to the predetermined axis, the peak part is a region including a position where the relative index difference is maximum. The tail part excluding the ring part is a region where the relative index difference decreases continuously from the peak part toward the cladding, and the ring part included in the tail part is a region having a discontinuously projecting shape of the relative index difference in the tail part.

Furthermore, in a first embodiment, when a is a radius along the reference line from the center of the center core to an outside of the ring part and c is a radius along the reference line from the center of the center core to a position where the relative index difference is maximum in the side core, the index profile is characterized by having a shape in which c/a is in the range of 2.25 to 2.50, so as to realize a first dispersion value in the range of 2.0 to 5.5 ps/nm/kin at the wavelength of 1530 nm, a second dispersion value in the range of 4.5 to 6.0 ps/nm/km at the wavelength of 1565 nm, a third dispersion value in the range of 8.5 to 11.2 ps/nm/km at the wavelength of 1625 nm, a cable cutoff wavelength in the range of not more than 1.45 μm, a bending loss in the diameter of 20 mm in the range of not more than 20 dB/m at the wavelength of 1550 nm, and an effective area in the range of 64 to 75 μm² at the wavelength of 1550 nm.

As a second aspect applicable to the first aspect, preferably, a maximum Δ1 of the relative index difference in the peak part is in the range of 0.55 to 0.70%, a minimum Δ2 of the relative index difference between the center core and the side core is in the range of 0.0 to 0.10%, a maximum Δ3 of the relative index difference in the side core is in the range of 0.14 to 0.21%, and the radius a is in the range of 2.0 to 3.0 μm.

As a third aspect applicable to at least either of the first and second aspects, a profile volume V of the ring part, which is defined by the formula below, is preferably more than 0%·μm² and not more than 0.11%·μm², where w is a width of the ring part along the reference line, r a radius from the center of the center core, and Δ(r) an index profile with respect to the radius r as a variable.

$$V = \int_{a-w}^{a} \Delta(r) r \, dr$$

As a fourth aspect applicable to at least any one of the first to third aspects, preferably, an increase Δring of the relative index difference in the ring part is more than 0% and not more than 0.6%, and a width w of the ring part along the reference line is more than 0.0 μm and not more than 0.5 μm.

As a fifth aspect applicable to at least any one of the first to fourth aspects, preferably, a radius b from the center of the center core to a position where the relative index difference is minimum between the center core and the side core is in the range of 3.0 to 5.0 μm and a radius d from the center of the center core to an outside of the side core is in the range of 7.0 to 10.0 μm.

As a sixth aspect applicable to at least any one of the first to fifth aspects, preferably, an index profile of the center core except for the ring part is an α-power profile and, more specifically, a value of α is in the range of 3.3 to 6.0.

An optical communication system according to the present invention comprises the optical fiber according to at least any one of the first to sixth aspects.

BRIEF DESCRIPTION OF THE DRAWINGS

FIG. 4 is a table showing a list of structures of Samples 1 to 4 of optical fibers according to the embodiment;

FIG. 5 is a table showing a list of characteristics of the optical fibers of Samples 1 to 4;

FIGS. 10A and 10B are tables showing respective lists of a structure and characteristics of optical fibers of Sample 5;

FIG. 15 is a table showing a list of structures of Samples 6 to 16 of optical fibers according to the embodiment;

FIG. 16 is a table showing a list of characteristics of the optical fibers of Samples 6 to 16.

DESCRIPTION OF THE PREFERRED EMBODIMENTS

Embodiments of the present invention will be described below in detail with reference to the accompanying drawings. The same elements will be denoted by the same reference signs in the description of the drawings, without redundant description.

A non-zero dispersion-shifted fiber (NZDSF) used as a signal light transmission path in an optical communication system has positive chromatic dispersion and small but non-zero absolute values of chromatic dispersion in the entire range of the C-band and the L-band. The optical fiber of this kind desirably has the characteristics (a) to (h) below. In the description hereinafter, these characteristics (a) to (h) will be referred to as "Condition 1."

Figure 1:
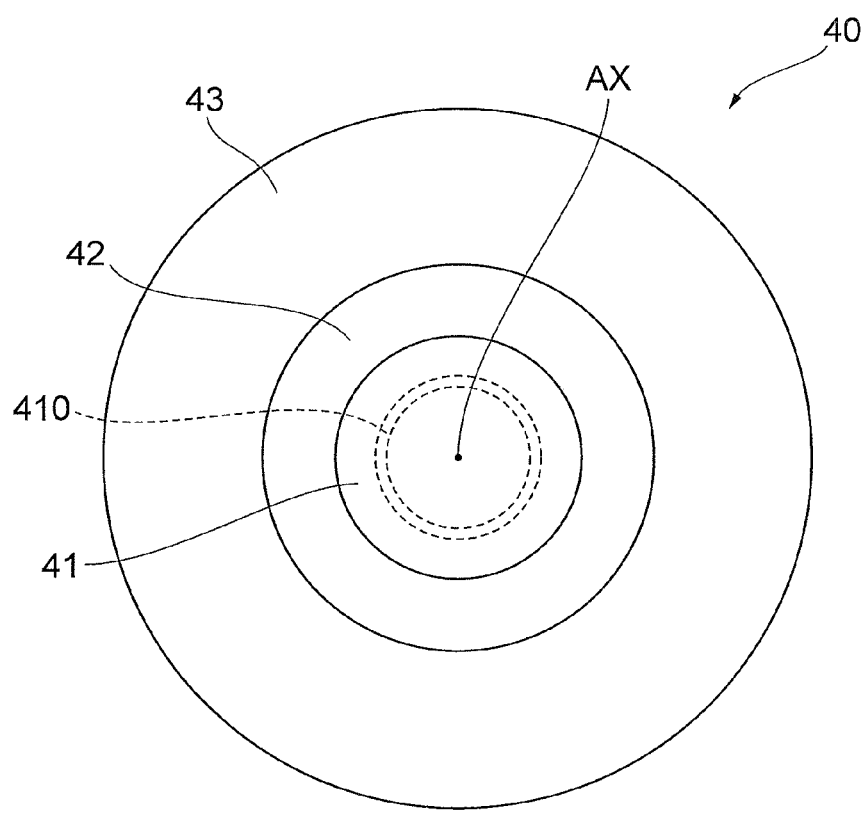
FIG. 1 is a drawing showing a sectional structure of an optical fiber according to an embodiment of the present invention.
Figure 2:
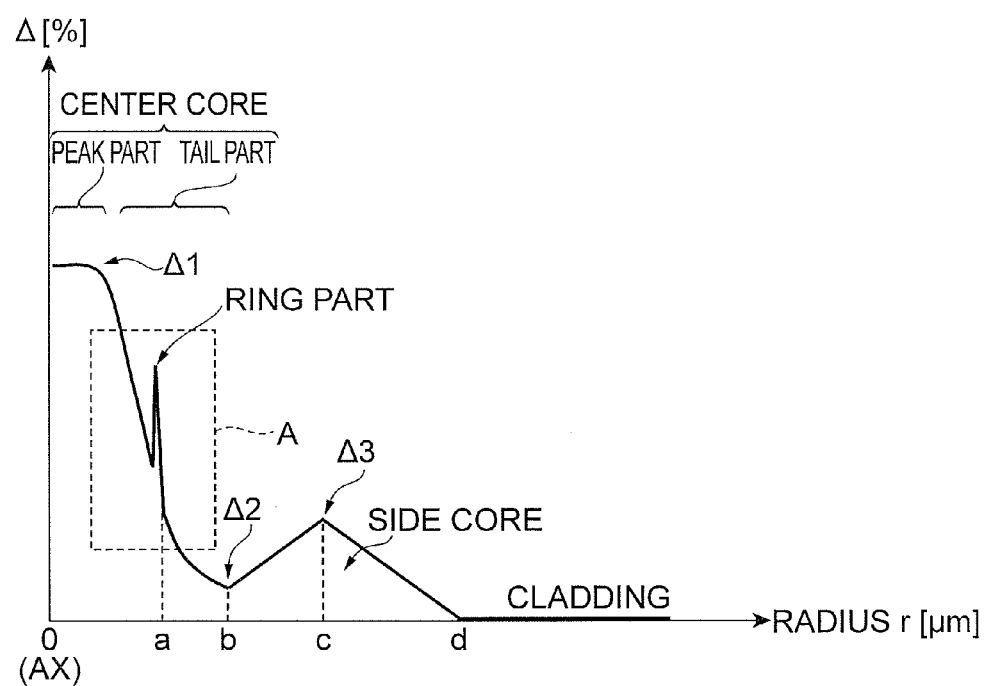
FIG. 2 is a drawing showing an index profile of the optical fiber according to the embodiment.
Figure 3:
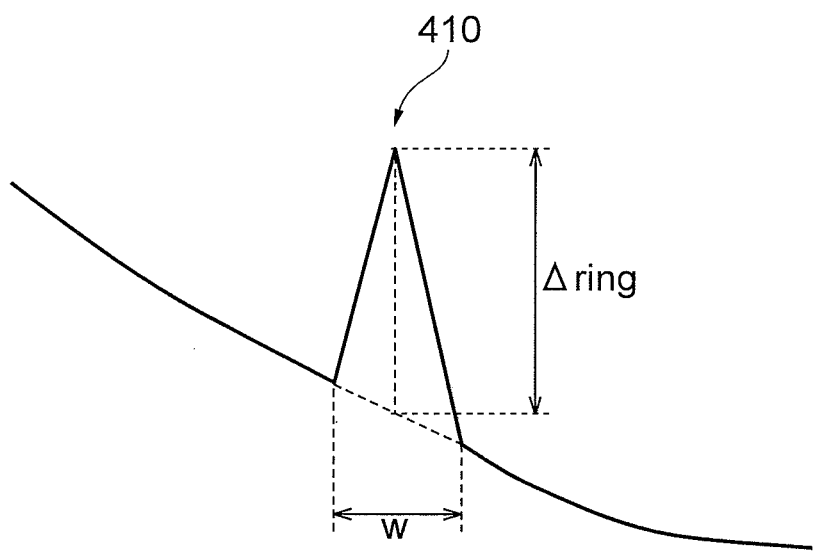
FIG. 3 is a drawing showing the index profile of the optical fiber according to the embodiment.

(a) Chromatic dispersion at the wavelength of 1530 nm (first dispersion value): 2.0-5.5 ps/nm/km
(b) Chromatic dispersion at the wavelength of 1565 nm (second dispersion value): 4.5-6.0 ps/nm/km
(c) Chromatic dispersion at the wavelength of 1625 nm (third dispersion value): 8.5-11.2 ps/nm/km
(d) Dispersion slope at the wavelength of 1550 nm: 0.090 or less ps/nm²/km
(e) Mode field diameter (MFD) at the wavelength of 1550 nm: 9.2-10.0 μm
(f) Effective area ($A_{eff}$) at the wavelength of 1550 nm: 64 or more μm²
(g) Cable cutoff wavelength ($\lambda_{cc}$): 1450 or less nm
(h) Bending loss in the diameter of 20 mm at the wavelength of 1550 nm: 20 or less dB/m FIG. 1 is a drawing showing a sectional structure of an optical fiber 40 according to an embodiment of the present invention and the optical fiber 40 according to the present embodiment has an index profile satisfying Condition 1 above. FIG. 2 and FIG. 3 are drawings showing the index profile of the optical fiber 40 according to the present embodiment. Particularly, FIG. 3 is an enlarged view of region A enclosed in a dashed line in FIG. 2. The optical fiber 40 according to the present embodiment has a center core 41 a center of which extends along a predetermined axis (optical axis AX), a side core 42 provided on an outer peripheral surface of the center core 41, and a cladding 43 provided on an outer peripheral surface of the side core 42. The center core 41 includes a ring part 410 having a projecting shape of relative index difference with respect to the refractive index of the cladding 43, along the radial direction. The foregoing index profile is defined by relative index differences $\Delta$ with respect to the refractive index of the cladding 43, of respective portions along a reference line perpendicular to the optical axis AX, as shown in FIG. 2. In the index profile of FIG. 2, therefore, a region corresponding to the center core 41 is comprised of a peak part including a position where the relative index difference $\Delta$ is maximum (position with $\Delta 1$), and a tail part, the tail part including a part in which the relative index difference decreases continuously from the peak part toward the cladding 43, and the ring part 410 having the discontinuously projecting shape of relative index difference.

The shape of the ring part in the center core 41 is realized by sharply changing a doping amount of an index increase agent such as Ge, in manufacturing a preform with a profile shape consisting of a peak part, a tail part, and a ring part of a projecting shape included in the tail part (which is a preform for obtaining the optical fiber 40 by drawing), for example, by the VAD process, the MCVD process, or the like.

Structural parameters characterizing the index profile of the optical fiber 40 according to the present embodiment are defined as follows. With respect to the refractive index of the cladding 43, a maximum of the relative index difference in the peak part of the center core 41 is represented by $\Delta 1$ [%], a minimum of the relative index difference between the center core 41 and the side core 42 by $\Delta 2$ [%], and a maximum of the relative index difference in the side core 42 by $\Delta 3$ [%]. A radius from the center of the center core 41 (agreeing with the optical axis AX) to the outside of the ring part 410 is represented by a [μm], a radius from the center of the center core 41 to a position where the relative index difference is minimum between the center core 41 and the side core 42, by b [μm], a radius from the center of the center core 41 to a position where the relative index difference is maximum in the side core 42, by c [μm], and a radius from the center of the center core 41 to the outside of the side core 42 by d [μm]. If the index profile gently changes with the radius r from the optical axis AX, the radii a and d are defined as positions where a derivative value of the relative index difference with respect to the radius r is negative and where an absolute value thereof becomes maximum. As shown in FIG. 3, $\Delta$ring [%] represents an increase of the relative index difference of the ring part with respect to a slope of the relative index difference of the tail part, and w [µm] a width of the projecting part of the relative index difference (the width of the ring part).

The optical fiber 40 of the present embodiment can have a wider tolerable range against variations of the structural parameters due to production variation, particularly, by setting c/a in an appropriate range.

FIG. 4 is a table showing a list of structures of optical fibers as Samples 1 to 4. FIG. 5 is a table showing a list of characteristics of the optical fibers as Samples 1 to 4. The optical fibers of Samples 1 to 4 have c/a set at 2.46, 2.41, 2.33, and 2.25, respectively, further satisfy Condition 1, and have the structural parameters including $\Delta 1$, $\Delta 2$, $\Delta 3$, and a set so that the mode field diameter (MFD) becomes near 9.6 µm.

Figure 6:
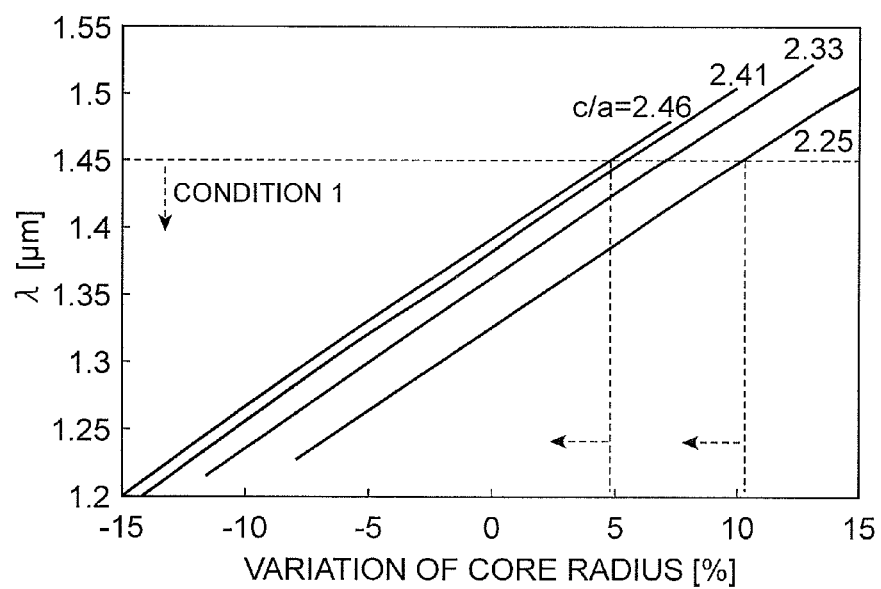
FIG. 6 is graphs showing changes of cable cutoff wavelength against variation of core radius of the respective optical fibers of Samples 1 to 4.

FIG. 6 is graphs showing changes of cable cutoff wavelength against variation of core radius of the respective optical fibers of Samples 1 to 4. As can be seen from FIG. 6, the cable cutoff wavelength ($\lambda_{cc}$) increases with increase in core radius, and the upper limit of the variation of core radius for satisfying $\lambda_{cc} \leq 1.45$ µm in Condition 1 is 10.1% in the case of c/a=2.25 and 4.8% in the case of c/a=2.46.

Figure 7:
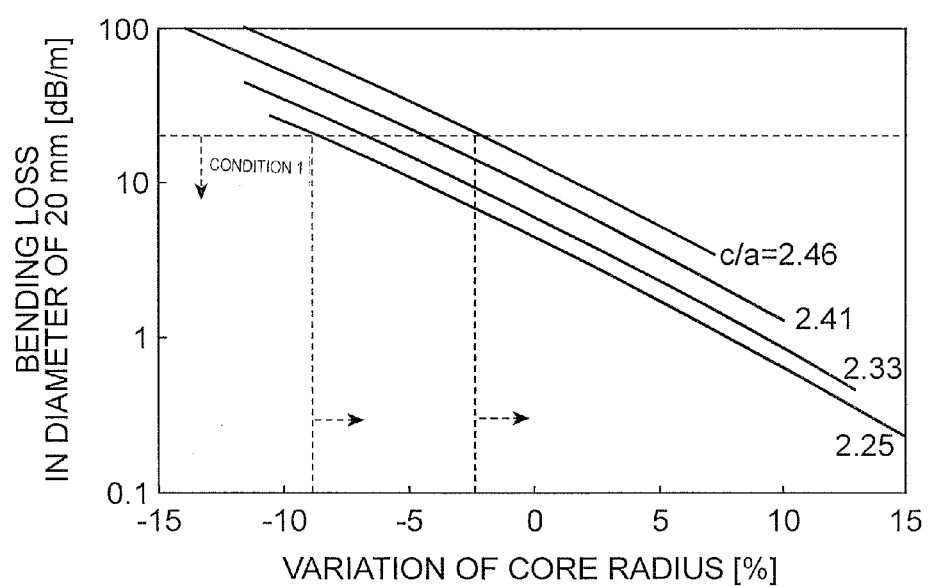
FIG. 7 is graphs showing changes of bending loss against variation of core radius of the respective optical fibers of Samples 1 to 4.

FIG. 7 is graphs showing changes of bending loss against variation of core radius of the respective optical fibers of Samples 1 to 4. As can be seen from FIG. 7, the bending loss increases with decrease in core radius, and the lower limit of the variation of core radius for satisfying the bending loss ≤20 dB/m in Condition 1 is −8.6% in the case of c/a=2.25 and −2.0% in the case of c/a=2.46.

Therefore, it is found from the graphs of FIGS. 6 and 7 that tolerances of variation of core radius for satisfying Condition 1 are −8.6% to 10.1% in the case of c/a=2.25 and −2.0% to 4.8% in the case of c/a=2.46. The tolerable range against variation of core radius becomes wider with decrease of c/a. All the fiber characteristics vary with variation in core radius, and the severest tolerable range is that for the conditions of $\lambda_{cc}$ and the bending loss.

Figure 8:
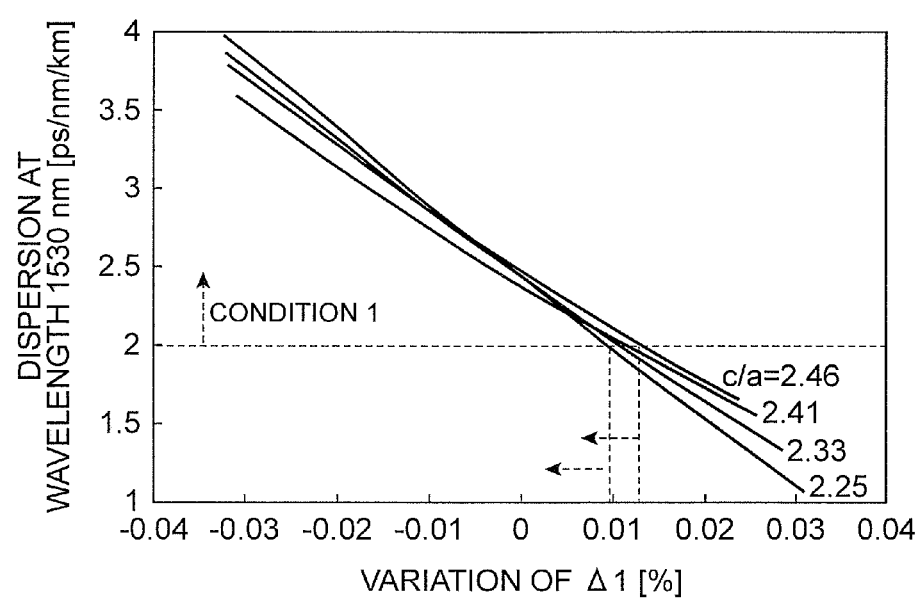
FIG. 8 is graphs showing changes of dispersion value at the wavelength 1530 nm against variation of $\Delta 1$ of the respective optical fibers of Samples 1 to 4.

FIG. 8 is graphs showing changes of dispersion value at the wavelength 1530 nm against variation of $\Delta 1$ of the respective optical fibers of Samples 1 to 4. As can be seen from FIG. 8, the dispersion value at the wavelength of 1530 nm decreases with increase of $\Delta 1$, and the upper limit of variation of $\Delta 1$ for satisfying the preferred range of dispersion at the wavelength of 1530 nm of 2.0 to 5.5 ps/nm/km in Condition 1 is 0.009% in the case of c/a=2.25 and 0.011% in the case of c/a=2.46.

Figure 9:
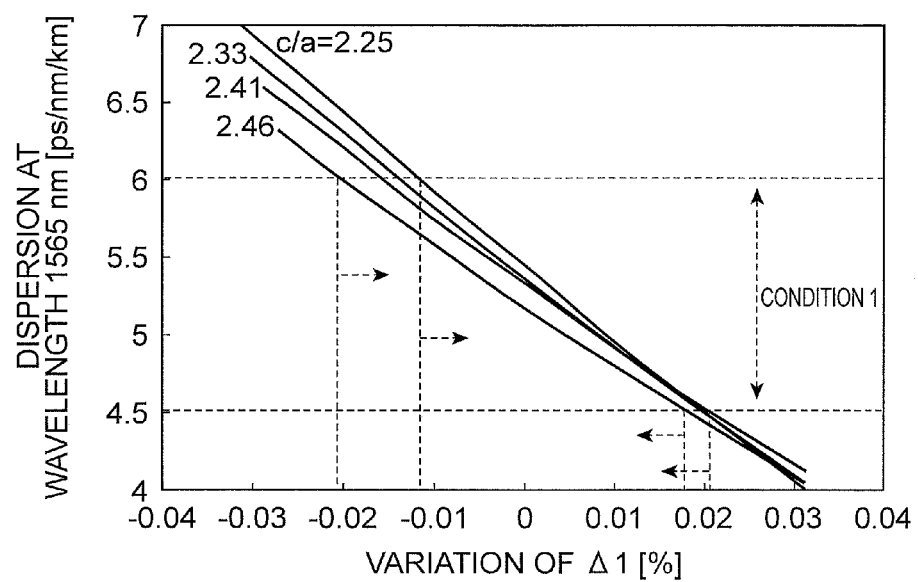
FIG. 9 is graphs showing changes of dispersion value at the wavelength 1565 nm against variation of $\Delta 1$ of the respective optical fibers of Samples 1 to 4.

FIG. 9 is graphs showing changes of dispersion value at the wavelength 1565 nm against variation of $\Delta 1$ of the respective optical fibers of Samples 1 to 4. As can be seen from FIG. 9, the dispersion value at the wavelength of 1565 nm increases with decrease of $\Delta 1$, and the lower limit of variation of $\Delta 1$ for satisfying the preferred range of dispersion at the wavelength of 1565 nm of 4.5 to 6.0 ps/nm/km in Condition 1 is −0.012% in the case of c/a=2.25 and −0.020% in the case of c/a=2.46.

Therefore, it is found from the graphs of FIG. 8 and FIG. 9 that the tolerances of variation of $\Delta 1$ for satisfying Condition 1 are −0.012 to 0.009% in the case of c/a=2.25 and −0.020 to 0.011% in the case of c/a=2.46. The tolerable range against variation of $\Delta 1$ becomes wider with increase of c/a. All the fiber characteristics vary with variation of $\Delta 1$, and the severest condition for satisfying Condition 1 is the condition for dispersion at the wavelengths of 1530 nm and 1565 nm.

It is confirmed by the above results that the tolerable range against variation of either the core radius or $\Delta 1$ becomes narrower with the ratio c/a being too large or too small. In order to ensure a wide tolerable range against overall structural parameter variation due to production variation, therefore, the ratio c/a needs to be set in an appropriate range. The ratio c/a is preferably in the range of 2.25 to 2.50, more preferably in the range of 2.3 to 2.46, and still more preferably in the range of 2.33 to 2.41.

FIG. 10A is a table showing a list of a structure of optical fibers of Sample 5. FIG. 10B is a table showing a list of characteristics of optical fibers of Sample 5.

Figure 11:
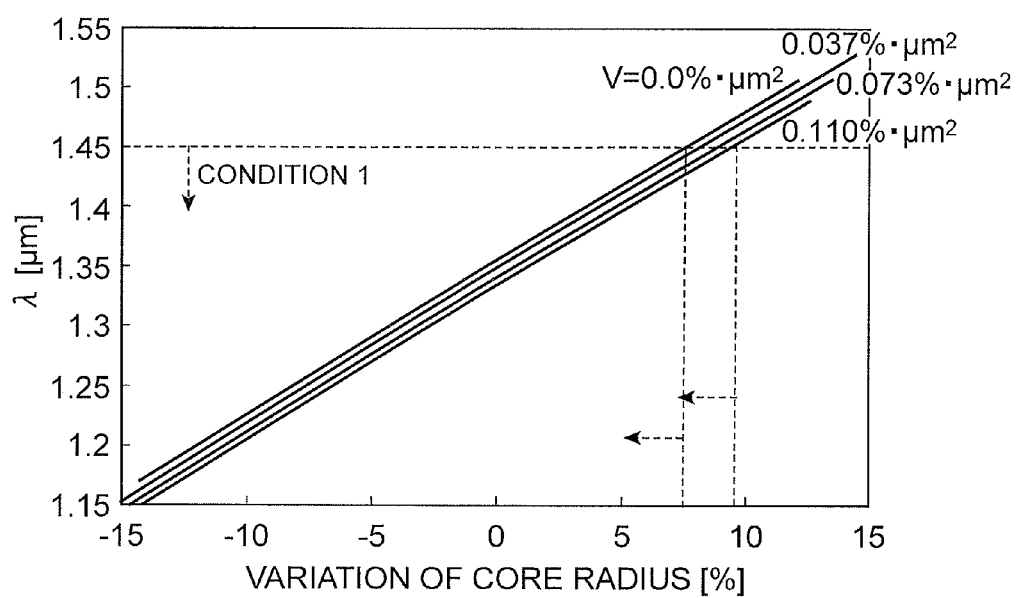
FIG. 11 is graphs showing changes of cable cutoff wavelength against variation of core radius with $\Delta$ring being 0.0, 0.2, 0.4, and 0.6%, in the optical fibers of Sample 5.

FIG. 11 is graphs showing changes of cable cutoff wavelength against variation of core radius with the profile volume V of the ring part 410 being 0.0, 0.037, 0.073, and 0.110%•µm², in the optical fibers of Sample 5. As can be seen from FIG. 11, the upper limit of variation of core radius for satisfying $\lambda_{cc} \leq 1.45$ µm in Condition 1 is 7.5% in the case of V=0.0%•µm² and 9.4% in the case of V=0.110%•µm².

Figure 12:
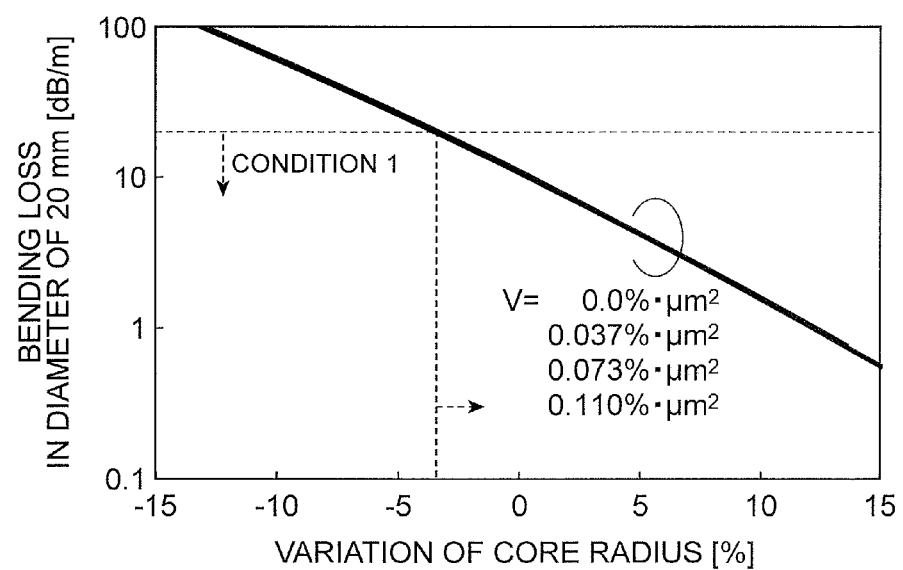
FIG. 12 is graphs showing changes of bending loss against variation of core radius with $\Delta$ring being 0.0, 0.2, 0.4, and 0.6%, in the optical fibers of Sample 5.

FIG. 12 is graphs showing changes of bending loss against variation of core radius with the profile volume V of the ring part 410 being 0.0, 0.037, 0.073, and 0.110%•µm² by change of $\Delta$ring, in the optical fibers of Sample 5. As can be seen from FIG. 12, the lower limit of variation of core radius for satisfying the bending loss ≤20 dB/m in Condition 1 is about −3.4%, independent of V.

Therefore, it is confirmed by the graphs of FIG. 11 and FIG. 12 that the tolerances of variation of core radius for satisfying Condition 1 are −3.4 to 7.5% in the case of V=0.0%•µm² and −3.4 to 9.4% in the case of V=0.110%•µm². The tolerable range against variation of core radius becomes wider with increase of V.

Figure 13:
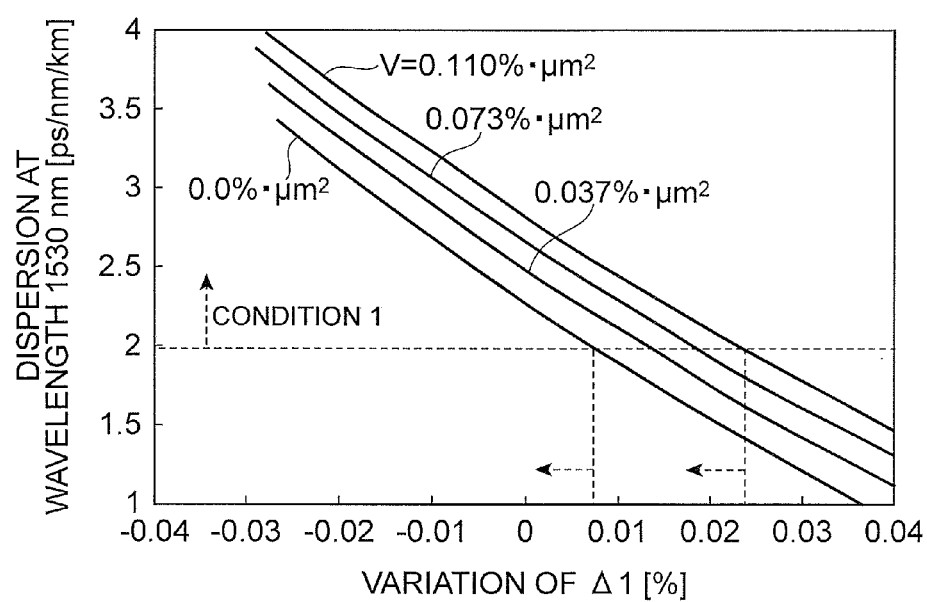
FIG. 13 is graphs showing changes of dispersion value at the wavelength 1530 nm against variation of $\Delta 1$ with $\Delta$ring being 0.0, 0.2, 0.4, and 0.6%, in the optical fibers of Sample 5.

Furthermore, FIG. 13 is graphs showing changes of dispersion value at the wavelength 1530 nm against variation of $\Delta 1$ with the profile volume V of the ring part 410 being 0.0, 0.037, 0.073, and 0.110%•µm² by change of $\Delta$ring, in the optical fibers of Sample 5. As can be seen from FIG. 13, the upper limit of variation of $\Delta 1$ for satisfying the preferred range of dispersion at the wavelength of 1530 nm of 2.0 to 5.5 ps/nm/km in Condition 1 is 0.007% in the case of V=0.0%•µm² and 0.023% in the case of V=0.110%•µm².

Figure 14:
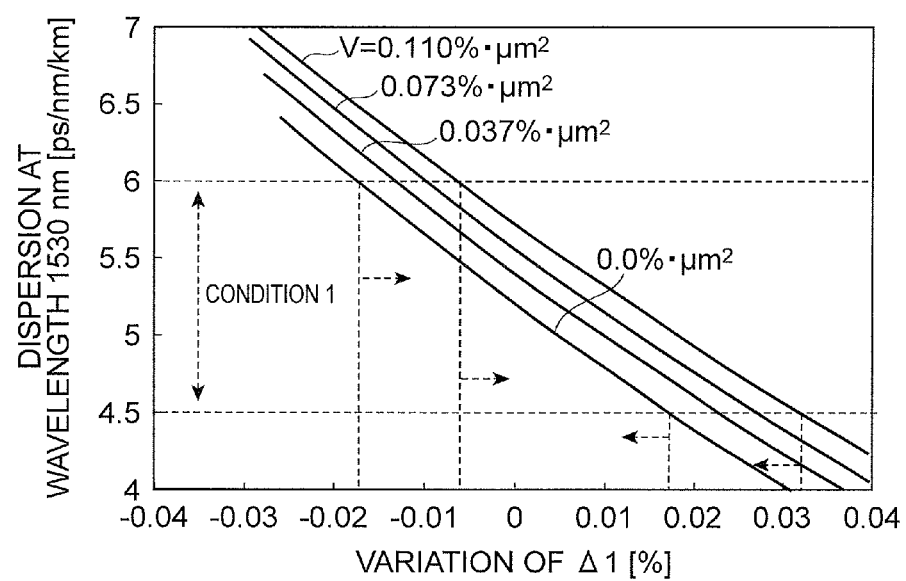
FIG. 14 is graphs showing changes of dispersion value at the wavelength 1565 nm against variation of $\Delta 1$ with $\Delta$ring being 0.0, 0.2, 0.4, and 0.6%, in the optical fibers of Sample 5.

FIG. 14 is graphs showing changes of dispersion value at the wavelength 1565 nm against variation of $\Delta 1$ with the profile volume V of the ring part 410 being 0.0, 0.037, 0.073, and 0.110%•µm² by change of $\Delta$ring, in the optical fibers of Sample 5. As can be seen from FIG. 14, the range of variation of $\Delta 1$ for satisfying the preferred range of dispersion at the wavelength 1565 nm of 4.5 to 6.0 ps/nm/km in Condition 1 is −0.017 to 0.017% in the case of V=0.0%•µm² and −0.007 to 0.032% in the case of V=0.110%•µm².

Therefore, it is confirmed by the graphs of FIG. 13 and FIG. 14 that the tolerances of variation of $\Delta 1$ for satisfying Condition 1 are −0.017 to 0.007% in the case of V32 0.0%•µm² and −0.007 to 0.023% in the case of V=0.110%•µm². The tolerable range against variation of $\Delta 1$ also becomes wider with increase of V.

Namely, the tolerable range against production variation becomes wider with increase of the profile volume V of the ring part 410. It is, however, difficult in manufacture to achieve a considerable local increase of doping amount of Ge. It also raises concern of increase in transmission loss. Therefore, the profile volume V of the ring part 410 is preferably in the range of 0.0 to 0.11%•µm², more preferably in the range of 0.0 to 0.10%•µm², and still more preferably in the range of 0.012 to 0.075%•µm².

FIG. 15 is a table showing a list of structures of optical fibers as Samples 6 to 16. FIG. 16 is a table showing a list of characteristics of the optical fibers as Samples 6 to 16. It is also easy to manufacture these optical fibers with desired characteristics at good yield.

There are a variety of conceivable cases for the index profile of the center core 41 in the optical fiber 40 of the present embodiment. When the index profile $\Delta(r)$ of the region within the radius a of the center core 41 except for the ring part 410 is approximated by the below formula, the value of α is preferably in the range of 3.2 to 6.0, in order to satisfy Condition 1 and maintain a wide tolerable range against variation of the structural parameters due to production variation.

$$\Delta(r)=\Delta 1\{(1-r/a)^\alpha\}$$

Figure 17:
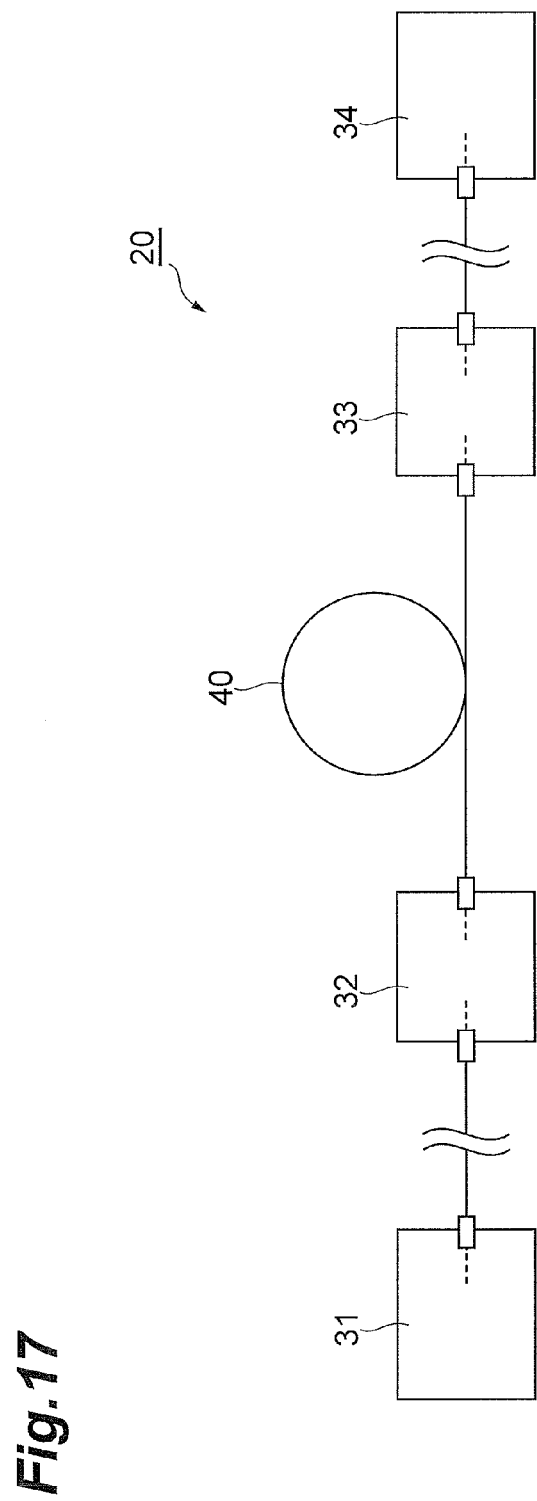
FIG. 17 is a drawing showing a configuration example of an optical communication system using the optical fiber of the embodiment.

FIG. 17 is a drawing showing a configuration example of an optical communication system 20 using the optical fiber 40 of the present embodiment. The optical communication system 20 is provided with a transmitter 31, a repeater 32, a repeater 33, and a receiver 34 and with the optical fiber 40 of the present embodiment as a transmission path to transmit signal light between the repeater 32 and the repeater 33. Each of the repeaters 32 and 33 includes an optical amplifier to amply the signal light. Each of the repeaters 32 and 33 preferably includes a dispersion compensating optical fiber.

As described above, the optical fiber according to the present invention readily achieves the desired characteristics without reduction of production yield.

What is claimed is:

1. An optical fiber comprising a center core a center of which extends along a predetermined axis, a side core provided on an outer peripheral surface of the center core, and a cladding provided on an outer peripheral surface of the side core,
   wherein in an index profile defined by relative index differences with respect to a refractive index of the cladding, of respective portions along a reference line perpendicular to the predetermined axis, a region corresponding to the center core has a peak part including a position where the relative index difference is maximum, and a tail part, the tail part including a part in which the relative index difference decreases continuously from the peak part toward the cladding, and a ring part in which the relative index difference has a shape projecting along a direction that the relative index difference increases,
   wherein when a is a radius along the reference line from the center of the center core to an outside of the ring part and c is a radius along the reference line from the center of the center core to a position where the relative index difference is maximum in the side core, the index profile has a shape in which c/a is in the range of 2.25 to 2.50, so as to realize a first dispersion value in the range of 2.0 to 5.5 ps/nm/km at the wavelength of 1530 nm, a second dispersion value in the range of 4.5 to 6.0 ps/nm/km at the wavelength of 1565 nm, a third dispersion value in the range of 8.5 to 11.2 ps/nm/km at the wavelength of 1625 nm, a cable cutoff wavelength in the range of not more than 1.45 μm, a bending loss in the diameter of 20 mm in the range of not more than 20 dB/m at the wavelength of 1550 nm, and an effective area in the range of 64 to 75 μm² at the wavelength of 1550 nm.

2. The optical fiber according to claim 1, wherein a maximum Δ1 of the relative index difference in the peak part is in the range of 0.55 to 0.70%,
   wherein a minimum Δ2 of the relative index difference between the center core and the side core is in the range of 0.0 to 0.10%,
   wherein a maximum Δ3 of the relative index difference in the side core is in the range of 0.14 to 0.21%, and
   wherein the radius a is in the range of 2.0 to 3.0 μm.

3. The optical fiber according to claim 1, wherein a profile volume V of the ring part, which is defined by the formula below, is more than 0%·μm² and not more than 0.11%·μm², where w is a width of the ring part along the reference line, r a radius from the center of the center core, and Δ(r) an index profile with respect to the radius r as a variable $$V=\int_{a-w}^{a}\Delta(r)rdr.$$

4. The optical fiber according to claim 1, wherein an increase Δring of the relative index difference in the ring part is more than 0% and not more than 0.6%, and
   wherein a width w of the ring part along the reference line is more than 0.0 μm and not more than 0.5 μm.

5. The optical fiber according to claim 1, wherein a radius b from the center of the center core to a position where the relative index difference is minimum between the center core and the side core is in the range of 3.0 to 5.0 μm, and
   wherein a radius d from the center of the center core to an outside of the side core is in the range of 7.0 to 10.0 μm.

6. The optical fiber according to claim 1, wherein an index profile of the center core except for the ring part is an α-power profile and a value of α is in the range of 3.3 to 6.0.

7. An optical communication system comprising the optical fiber as defined in claim 1, as a signal transmission path.

8. An optical fiber comprising a center core a center of which extends along a predetermined axis, a side core provided on an outer peripheral surface of the center core, and a cladding provided on an outer peripheral surface of the side core,
   wherein in an index profile defined by relative index differences with respect to a refractive index of the cladding, of respective portions along a reference line perpendicular to the predetermined axis, a region corresponding to the center core has a peak part including a position where the relative index difference is maximum, and a tail part, the tail part including a part in which the relative index difference decreases continuously from the peak part toward the cladding, and a ring part having an inside and an outside surrounding the inside, the inside of the ring part having the relative index difference increasing continuously from the peak part toward the cladding, the outside of the ring part having the relative index difference decreasing continuously from the peak part toward the cladding,
   wherein when a is a radius along the reference line from the center of the center core to an outside of the ring part and c is a radius along the reference line from the center of the center core to a position where the relative index difference is maximum in the side core, the index profile has a shape in which c/a is in the range of 2.25 to 2.50, so as to realize a first dispersion value in the range of 2.0 to 5.5 ps/nm/km at the wavelength of 1530 nm, a second dispersion value in the range of 4.5 to 6.0 ps/nm/km at the wavelength of 1565 nm, a third dispersion value in the range of 8.5 to 11.2 ps/nm/km at the wavelength of 1625 nm, a cable cutoff wavelength in the range of not more than 1.45 μm, a bending loss in the diameter of 20 mm in the range of not more than 20 dB/m at the wavelength of 1550 nm, and an effective area in the range of 64 to 75 μm² at the wavelength of 1550 nm.

9. The optical fiber according to claim 8, wherein a maximum Δl of the relative index difference in the peak part is in the range of 0.55 to 0.70%,
   wherein a minimum Δ2 of the relative index difference between the center core and the side core is in the range of 0.0 to 0.10%,
   wherein a maximum Δ3 of the relative index difference in the side core is in the range of 0.14 to 0.21%, and
   wherein the radius a is in the range of 2.0 to 3.0 μm.

10. The optical fiber according to claim 8, wherein a profile volume V of the ring part, which is defined by the following formula, $$V = \int_{a-w}^{a} \Delta(r) r dr,$$

is more than 0%·μm² and not more than 0.11%·μm², where w is a width of the ring part along the reference line, r a radius from the center of the center core, and Δ(r) an index profile with respect to the radius r as a variable.

11. The optical fiber according to claim 8, wherein an increase Δring of the relative index difference in the ring part is more than 0% and not more than 0.6%, and
   wherein a width w of the ring part along the reference line is more than 0.0 μm and not more than 0.5 μm.

12. The optical fiber according to claim 8, wherein a radius b from the center of the center core to a position where the relative index difference is minimum between the center core and the side core is in the range of 3.0 to 5.0 μm, and
   wherein a radius d from the center of the center core to an outside of the side core is in the range of 7.0 to 10.0 μm.

13. The optical fiber according to claim 8, wherein an index profile of the center core except for the ring part is an α-power profile and a value of α is in the range of 3.3 to 6.0.

14. An optical communication system comprising the optical fiber as defined in claim 8, as a signal transmission path.

* * * * *